United States Patent

Voss

[11] Patent Number: 5,871,835
[45] Date of Patent: Feb. 16, 1999

[54] CELLULAR MATERIAL STRIP

[75] Inventor: Klaus-Wilhelm Voss, Uetersen, Germany

[73] Assignee: Vosschemie GmbH, Uetersen, Germany

[21] Appl. No.: 688,035

[22] Filed: Jul. 26, 1996

[30] Foreign Application Priority Data

Jun. 18, 1996 [DE] Germany ............... 296 10 642.9

[51] Int. Cl.$^6$ ................................................. B32B 3/08
[52] U.S. Cl. .................... 428/158; 428/167; 428/317.1; 428/317.3
[58] Field of Search ............... 428/304.4, 317.1, 428/317.3, 158, 159, 167; 427/282, 300

[56] References Cited

U.S. PATENT DOCUMENTS

| | | | |
|---|---|---|---|
| 3,353,315 | 11/1967 | Barker | 428/167 |
| 4,046,940 | 9/1977 | Prikkel, III | 428/158 |
| 4,215,166 | 7/1980 | Bussey, Jr. | 428/167 |
| 4,900,607 | 2/1990 | Glang et al. | 428/167 |
| 5,013,597 | 5/1991 | Kracke | 428/158 |
| 5,143,772 | 9/1992 | Iwasa | 264/45.9 |
| 5,376,319 | 12/1994 | Arima | 264/46.1 |
| 5,538,777 | 7/1996 | Pauley et al. | 428/318.8 |
| 5,604,021 | 2/1997 | Wagner | 428/158 |
| 5,733,630 | 3/1998 | Frisch et al. | 428/158 |

*Primary Examiner*—Allan R. Kuhns
*Attorney, Agent, or Firm*—Friedrich Kueffner

[57] ABSTRACT

For sealing and for covering a gap, more particularly between a fixed and a movable body portion of a motor vehicle, independently of its width, a strip of cellular material (100) is emloyed, whose surface is partly provided with an adhesive coat (24) and which, at a predetermined point, possesses such a bend (14) that a first and a second cellular material strip leg (10,12) is formed in order to be able, when introducing into the gap to be sealed the cellular material strip with the cross swection of the legs, while following the introduction, the entire length of the cellular material strip over both legs prevents the cellular material strip from protruding from the gap and thus offers at the same time a sealing retaining force by means of the compressed legs so that the gap is covered.

8 Claims, 20 Drawing Sheets

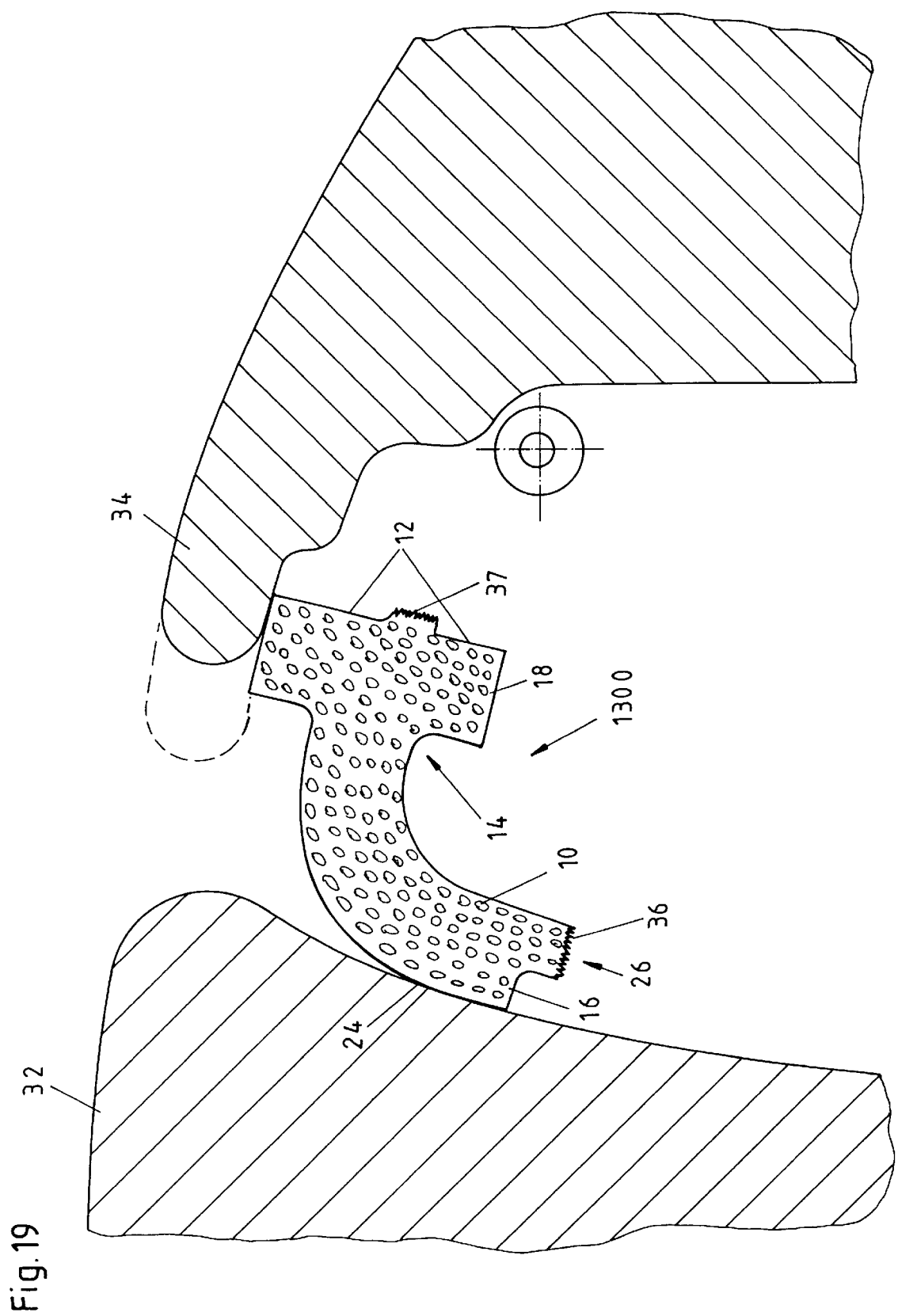

CELLULAR MATERIAL STRIP

CELLULAR MATERIAL STRIP

The invention relates to a strip of cellular material, whose surface is partially provided with an adhesive coat.

BACKGROUND OF THE INVENTION

Numerous embodiments of cellular material strips are known to be employed as sealing and/or covering strips, for instance when vehicles or the like are to be partially enamelled. In this case not merely the penetration of paint mists into a gap between body portions is intended to be prevented. It is rather also a question of preventing that, when paint mists are spray ed, particles of foreign matter are hurled out from the joint due to air vortexing. Such contaminating particles may be deposited on the freshly applied enamel and result in a defective enamel spot.

Thus, by way of example, strips of cellular material possessing a rectangular cross section are known, in which one side of the cellular lateral strip is provided with an adhesive coat so as to fix the strip at the desired point of the object to be sealed. Strips of this type are also made use of when windows and doors are sealed.

Also other cross-sectional configurations have been disclosed by the state of the art, such as circular or approximately circular strips of cellular material, which are likewise provided with an adhesive coat for fixation purposes. In order to increase the flexibility, these strips may also be constructed in the form of hollow bodies.

However, in the known cellular material strips for sealing and covering it is disadvantageous that the possibilities of application of a specific cellular material strip are restricted to a specific task since, on account of the dimensioning and plastic configuration of the strip of cellular material involved, the same can be used only for a defined joint width or suchlike.

Furthermore, the fitting or inserting of the strips into a gap to be sealed is difficult and tedious since, for a firm hold of the cellular material strip, the same has to be considerably larger than the gap to be sealed. This oversize, however, has to be first of all pressed through the significantly narrower gap.

That is why the technical problem of the present invention is to provide cellular material strips to be employed as sealing and/or covering strips as well as to make system of cellular material strips available that can be universally employed, i.e. almost very largely independently of the width of the gap to be sealed or covered in any objects whatever, as well as to provide a method, a device and an applicator for the insertion or application of the cellular. material strip, which make a simple fitting of the strip possible.

SUMMARY OF THE INVENTION

In accordance with the invention, a cellular material strip is provided whose surface is partially provided with an adhesive coat, in which case the cellular material strip, at a predetermined point, is provided with such a bend that it possesses a first and a second leg. This has the advantage that the cellular material strip, when being inserted into a gap to be sealed, has to be introduced solely with the cross section of the legs while, subsequent to the introduction, the entire length of the cellular material strip across both legs prevents the cellular material strip from emerging from the gap and thus simultaneously provides a sealing retaining force by means of the compressed legs.

By the provision of one longer and one shorter leg, the introduction of the shorter leg and consequently the fitting of the cellular material strip according to the invention is facilitated in an advantageous manner.

The formation of deformation grooves, by way of example, in the form of bending joint or groove, expanding joint at groove, results in a particularly advantageous fashion in a highly flexible cellular material strip, in which the introduction into the gap is facilitated with the simultaneous retention of adequate retaining and sealing forces of the cellular material strip incorporated into the gap.

Due to the circumstance that the bend has an angle of exactly 90°, the straight and uniform application of the adhesive strip is ensured. Consequently a uniform contour is achieved and a complete and sealing support in the gap to be sealed is achieved.

By the provision of adhesive coats on one or on both legs and there in each case at one or several points, retention points are additionally provided in an advantageous fashion by means of adhesive connections in the gap which ensure a secure and satisfactory sealing support of the cellular material sprip.

A cross section which is constant over the entire length of the cellular material strip permits a simple and speedy insertion of the cellular material strip into the gap to be sealed.

In a particularly advantageous manner at least one leg extends on both sides in relation to the corresponding other leg, whereby a T-configured section is produced so that an even better sealing is ensured.

Moreover, according to the invention provision is made for employing the aforesaid cellular material strip for the sealing of gaps or as a sealing element, more especially for the sealing of gaps or joints between a fixed body portion and a movable body portion of motor vehicles. This offers the advantage that the time-consuming task of covering by sticking over and sealing prior to enamelling particularly of motor vehicle body portions is cut short and simplified, which results in a lowering of costs.

Furthermore, provision is made according to the invention that a device be provided for inserting an aforementioned strip of cellular material into a gap to be sealed or into a joint to be sealed, especially into a gap or joint between a fixed body portion and a movable body portion of motor vehicles, which is comprised of a rod having a predetermined length which is greater than the thickness of the rod so that a flat top side and underside is formed, while on the underside a raised portion vertically aligned with the same and, on the top side, an adhesion-preventing, a so-called anti-stick coat, more particularly silicone paper, is disposed.

Through the formation of the distance between one end of the rod and the raised portion corresponding approximately to the length of the first leg of the cellular material strip, a simple handling of the device is produced since it has not to be estimated how far the rod is to be inserted, but, in lieu thereof, the rod is simply introduced as far as the stop.

Pressure pads on at least one end of the rod support in an advantageous manner the pressing on of the leg of the cellular material strip disposed inside the gap and thus prevent any possible damage to the cellular material strip when the same is preed on.

Due to the underside being also provided with an antistick coat, by preference silicone paper, the task of inserting and detaching the cellular material strip is facilitated because the adhesive coat tends, at the slightest contact, e.g. with a body sheet, to adhere to the same and thus, possibly, for the complete insertion of the cellular material strip into a gap to be sealed, has to be detached once again.

Provision is also made according to the invention for proposinh a method for the insertion of an aforementioned strip of cellularmaterial into a gap or a joint to be sealed, more particularly into a gap or a joint between a fixed body portion and a movable body portion of motor vehicles, comprising the following steps, a) Insertion of the first leg into the gap to be sealed,
   b) Establishment of an adhesive connection between the first leg and a first gap wall, more especially of a motor vehicle body portion, and
   c) Insertion of the second leg into the gap to be sealed.

This has the advantage that, when the cellular material strip is fitted, only the cross section of the legs has to be passed through the gap to be sealed.

The establishment of an adhesive connection between the second leg and a second gap wall oppositely located to the first gap wall in a further step improves the retention of the cellular material strip and of the sealing provided by the same.

In step (b), the aforementioned device is introduced in a perticularly advantageous manner into the gap between the second leg and the second gap wall until the raised portion comes to stop at the gap entry and the device is rotated about a point of rotation on the stop of the raised portion so that the introduced end of the device urges the first leg against the first gap wall. This makes a speedy and simple execution of the step (b) possible.

The employment of the aforementioned device in the step (c) by putting one end of said device onto the bend or kink of the cellular material strip and pressing the device into the gap so that the second leg is inserted into the gap to be sealed, permits an accurate and secure placement of the cellular material strip in the gap to be sealed in an advantageous fashion.

Due to the circumstance that, prior to the step (a), the movable body portion is opened by 20° through 50°, more particularly through 30° to 45° and, subsequent to step (b), is closed again, it is possible for the cellular material strip to be simply and directly applied by hand.

It is furthermore provided according to the invention to propose a configuration of the aforesaid cellular material strips, in which case at least two cellular material strips are aligned relative to one another in such a way that that the end facing away from the bend of the first leg of a cellular material strip abuts in each case against the bend region of a further cellular material strip, while the first legs of the cellular material strips are aligned with one another and wherein the cellular material strips, at these junction points, are interconnected by means of a tear-off bridge so as to form a chain.

The provision of separating notches within the region of the junction points supports in an advantageous manner a simple isolation of the cellular material strips by tearing off the tear-off bridges.

An applicator according to the invention is designed in such a way that the applicator, on one end, is provided with a guide bar that encloses an end of the cellular material section facing away from the adhesive tape in such a way that the celluler material section can be guided along the guide bar and inside the bar and, prior to an emergence from the bar, be secured in the vertical direction relative to the same, in which case the bar possesses a longitudinal slot, from which projects an end of the cellular material section bearing an adhesive coat, while further along the longitudinal slot, a first limit stop is formed which supports the portion of the cellular material section that projects from the longitudinal slot on a side located opposite the adhesive coat and wherein, furthermore, a grip is disposed on a side of the guide bar that faces away from the longitudinal slot. This results in an advantageous manner in a device with the aid of which a cellular material strip can be simply and expeditiously fitted into a joint or a gap.

By means of the second limit stop, which is disposed on an end of the grip facing the guide bar, a simple handling is achieved in a particularly advantageous manner since the depth of insertion of the cellular material section is determined by the strip and does not have to be manually adjusted.

An adjustable second stop makes an adaptation of the applicator to different types of gaps and joints possible in this case in an advantageous fashion.

A grip angled relative to the first stop improves the handling of the applicator in a particularly advantageous manner.

Owing to an adhesion-preventing or anti-stick coat being disposed on the end of the grip which faces away from the guide bar, it is possible to additionally employ the grip for the complete insertion of the cellular material section into the gap. This reduces the number of the tools required for applying the cellular material section.

Sliding or gliding pads on the first and/or the second stop prevent a scratching of the adjacent body portion.

Further advantageous constructions are characterized in the subclaims.

BRIEF DESCRIPTION OF THE DRAWINGS

In the following the invention is described in greater detail with the aid of the drawings. Thus

FIGS. 18 and 19 show in a sectioned view a fifth embodiment of the cellular material strip according to the invention;

DETAILED DESCRIPTION OF THE PREFERRED EMBODIMENT

Figure 1:
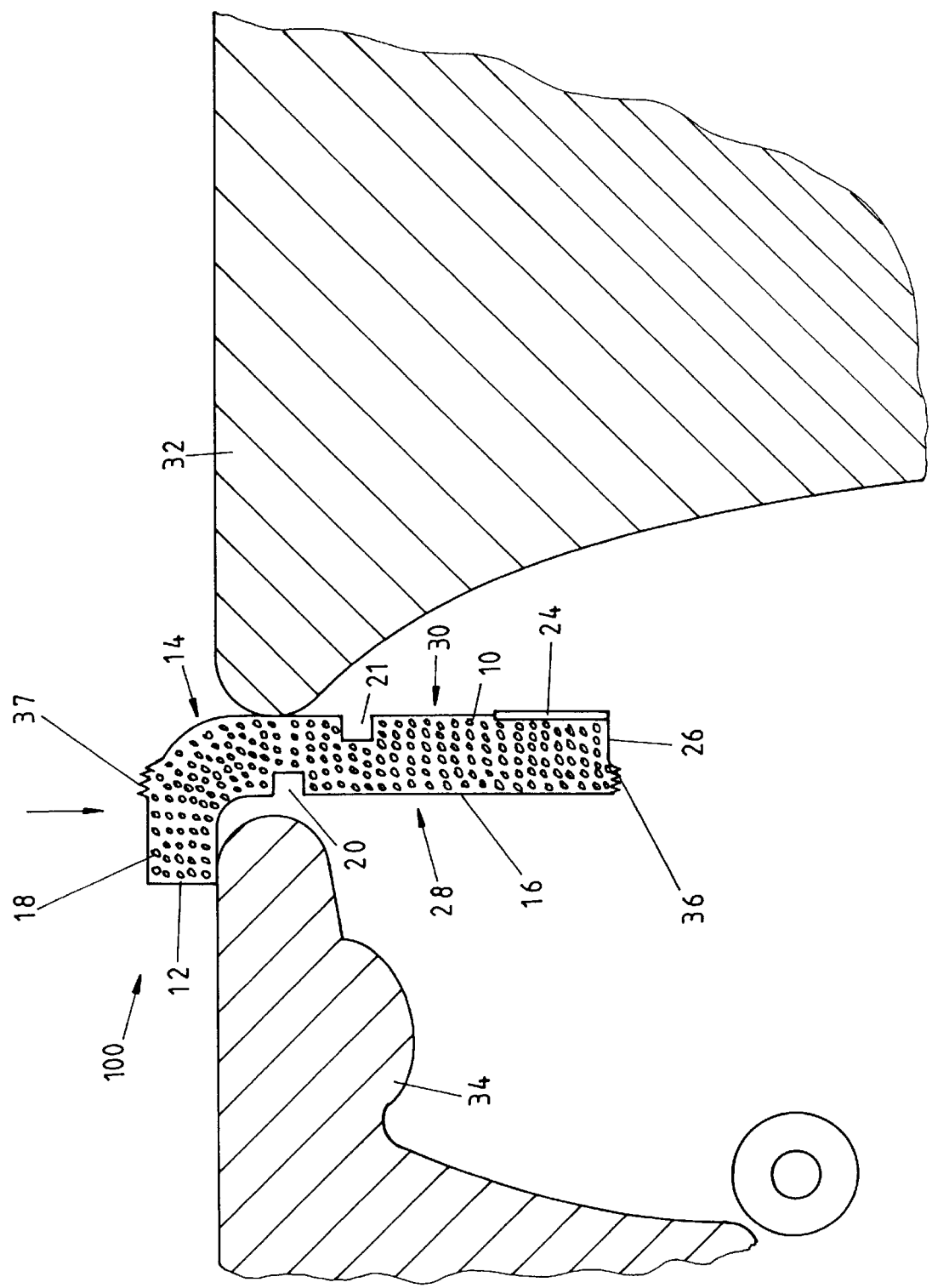
FIGS. 1 through 3 show in a sectioned view a first embodiment of the cellular material strip according to the invention in different configurations while being fitted into a gap between two body portions.
Figure 2:
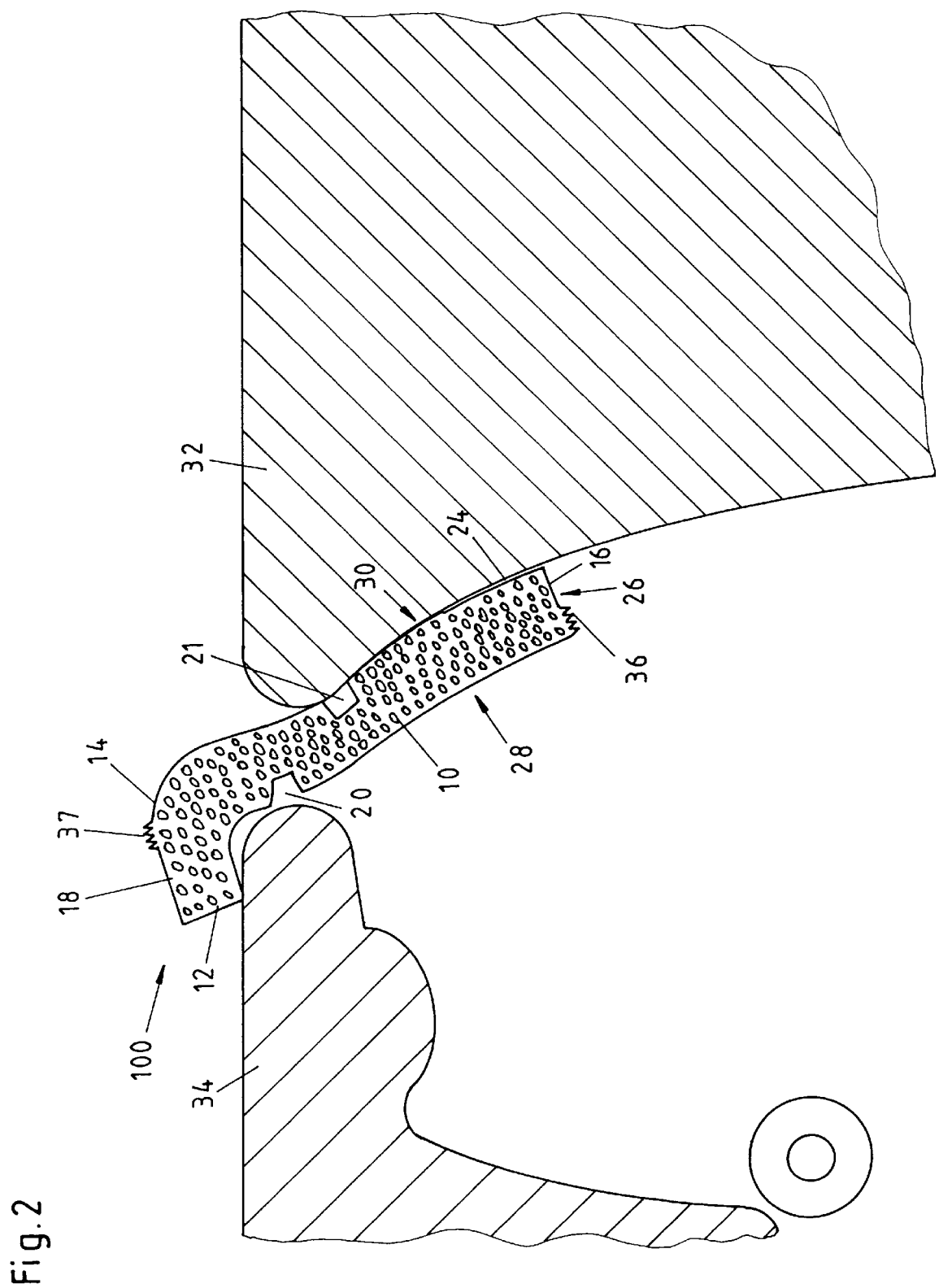
Figure 3:
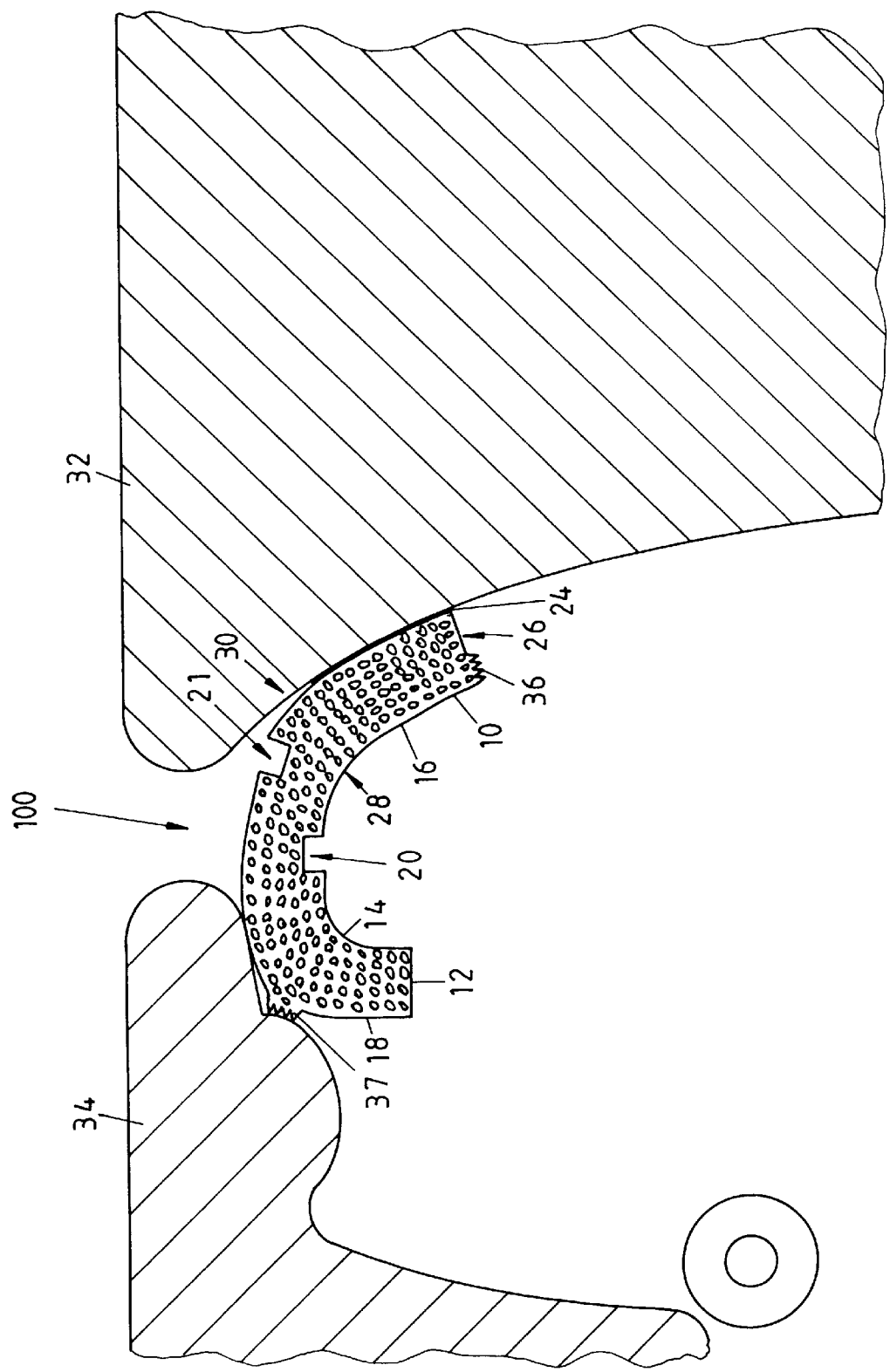

The FIGS. 1 through 3 depict a sectional view of a first embodiment of the cellular material strip 100 according to the invention in different configurations while being fitted into the gap between two vehicle body portions 32, 34. In the FIG. 1, the cellular material strip 100 is inserted into a gap to be sealed with its long leg 16. The short leg 18 is supported on the outside on the body portion 34. The cellular material strip 100 possesses two deformation grooves 20,21 and an adhesive coat 24 at the end 26 on the side 30 of the leg 16. When pressing on the leg 16 (FIG. 2), an adhesive connection is produced between the leg 16 and the body portion 32, which retains the cellular material strip 100 in its position. After that the leg 18 is pressed through the gap (FIG. 3). By virtue of the elasticity of the cellular material strip 100, the same, while supported on the adhesive point, is pressed against the body portion 34. The deformation grooves 20,21 support the elastic deformation of the cellular material strip 100. These grooves, depending upon their state of fitting, acts as expansion, compression or upsetting grooves or joints. In the FIG. 3, the sealing connection between the cellular material stop 100 and the body portions 32,34 is established and the fitting of the cellular material strip 100 is terminated.

As becomes apparent from the FIGS. 1 through 3, merely three simple steps are necessary for the fitting of the cellular material strip 100. This simplifies the fitting of the cedllular material strip 100 significantly in comparison with known strips of cellular material.

Furthermore, the cellular material strip 100 possesses tear-off edges 36,37. These stem from the chain-like configuration of the cellular material strips prior to their fitting, as will still be explained hereinafter. The tear-off edge 37 in particular, in the present embodiment, possesses the additional effect of preventing a springing back of the leg 18 from the position illustrated in the FIG. 3.

The adhesive coat 24 may e.g. be a pressure-sensitive adhesive, by preference a so-called hot-melt adhesive.

As cellular material, preferably an open-cell soft cellular material of polyurethane possessing a relative density of 25–35 kg/m$^3$ is employed, but also other cellular materials, such as polyester foams, polystyrene foams, PVC foams, polyethylene foams, polyisocyanate foams, polyphenol foams and silicone foams may be made use of.

The strips of cellular material are preferably cut out from pertinent blocks.

Figure 4:
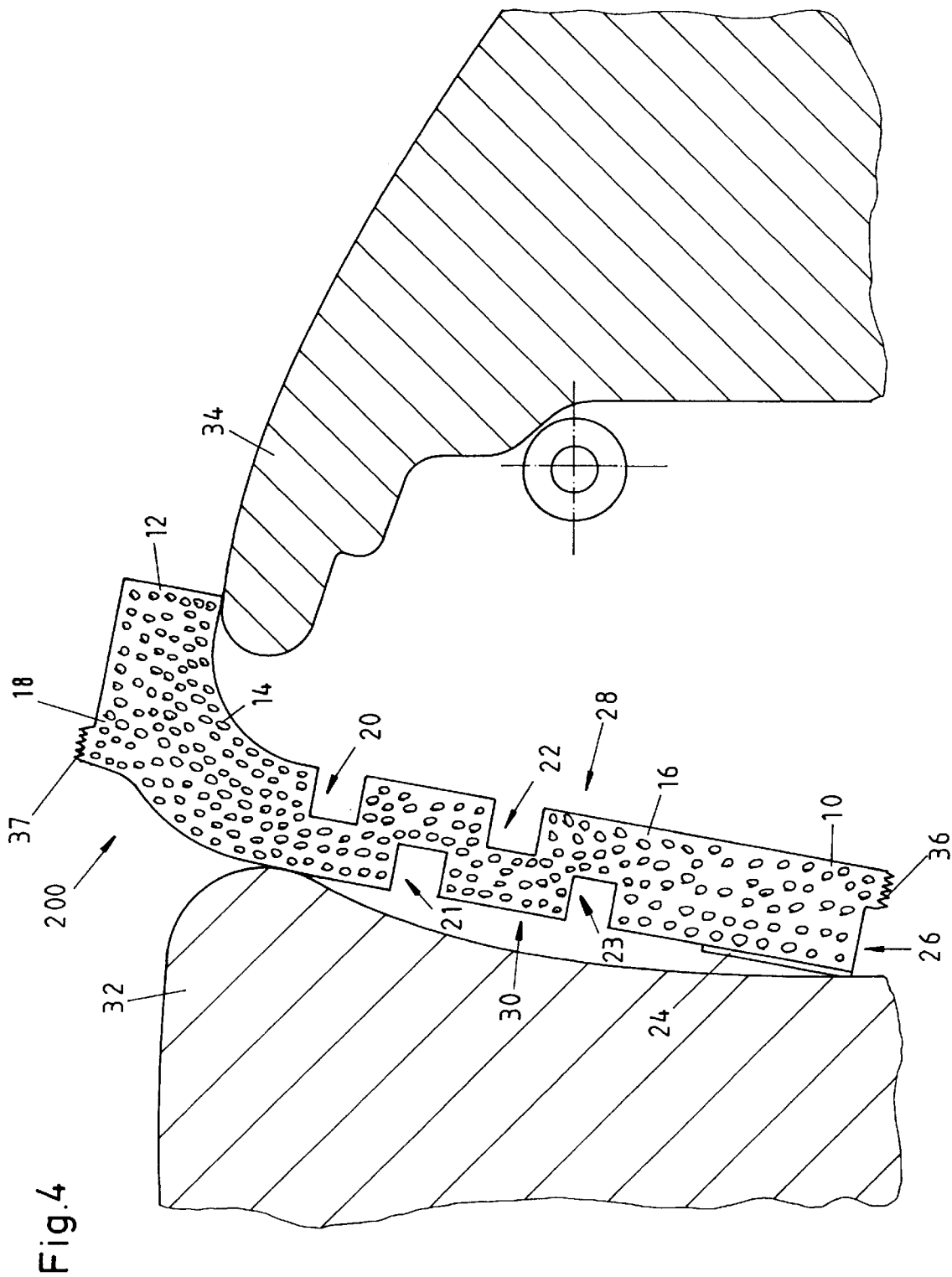
FIGS. 4 and 5 show in a sectioned view a second embodiment of the cellular material strip according to the invention in different configurations while being fitted into a gap between two body portions.
Figure 5:
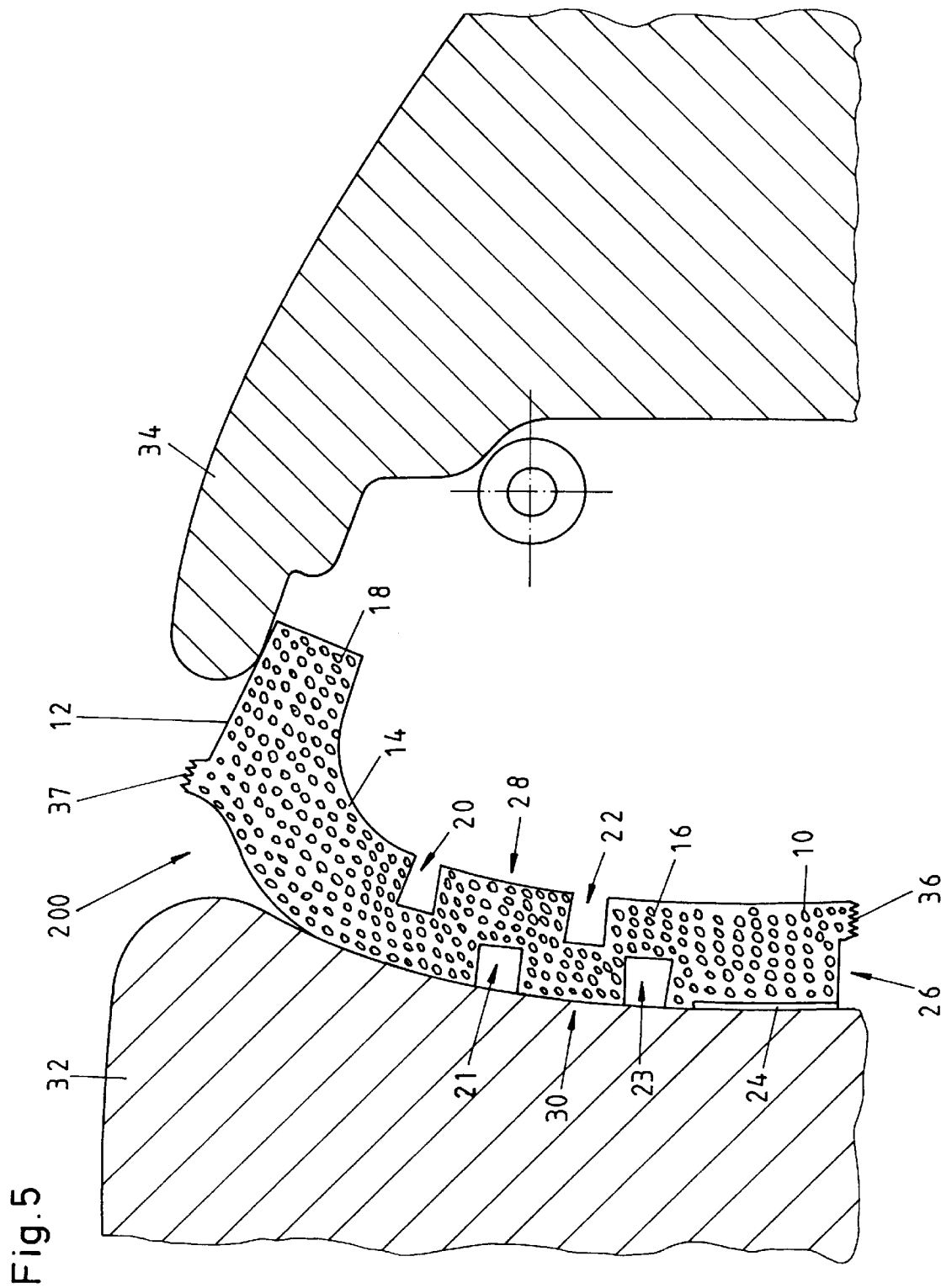

FIGS. 4 and 5 show in a sectioned view a second embodiment of the cellular material strip 200 according to the invention in different configurations while being fitted into a gap between two vehicle body portions 32,34, analogously to the FIGS. 1 through 3. This cellular material strip 200 corresponds essentially to the cellular material strip 100 of FIGS. 1 through 3, it does, however, possess four deformation grooves 20,21,22,23 and the long leg, in relation to the short leg 18, still is somewhat longer. The disposition of the cellular material strip and its position with pertinent sealing function corresponds to the situation already described with the aid of the FIGS. 1 through 3.

Figure 6:
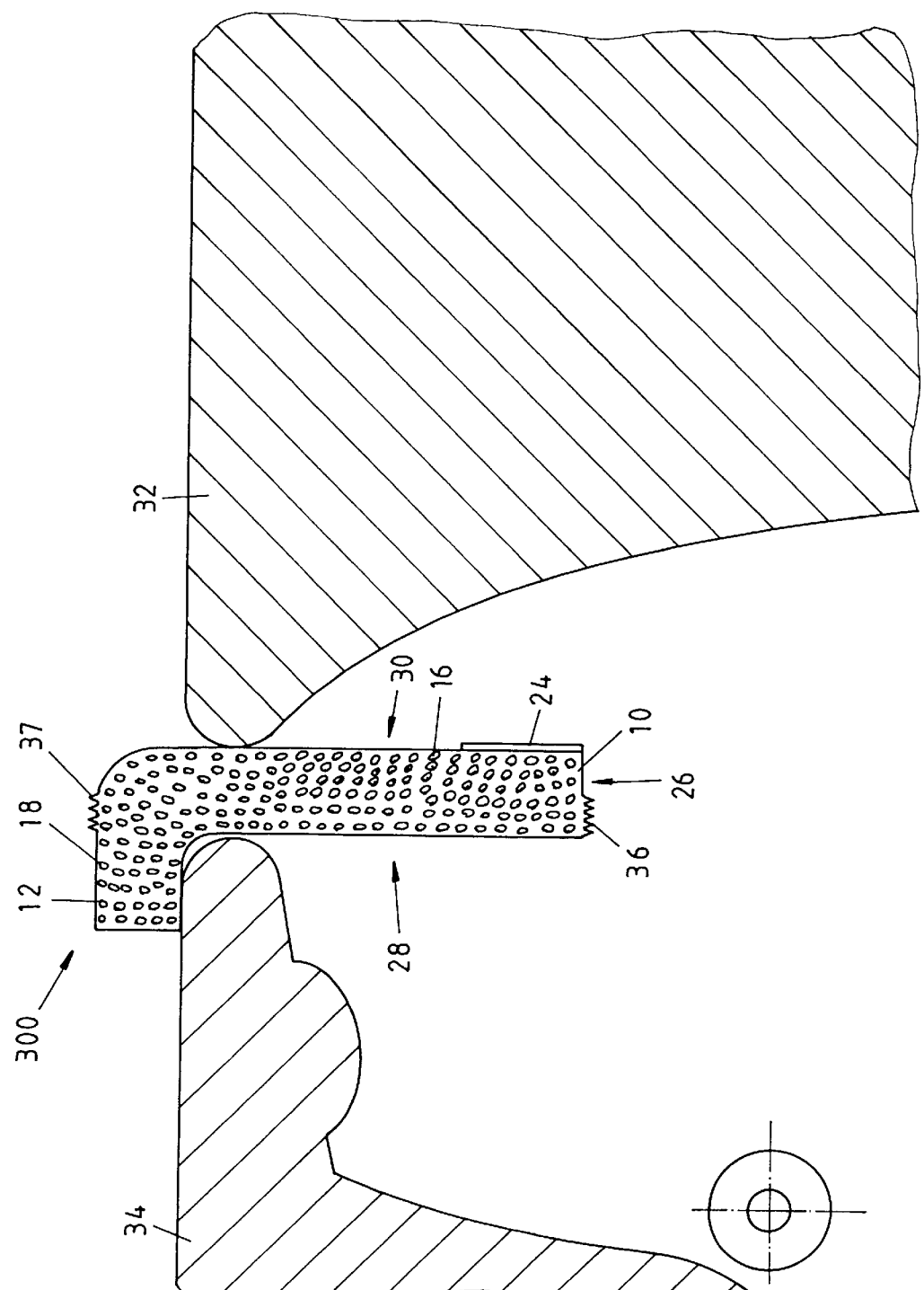
FIGS. 6 through 8 show in a sectioned view a third embodiment of the cellular material strip according to the invention in different configurations while being fitted into a gap between two body portions, with a fitting aid.
Figure 7:
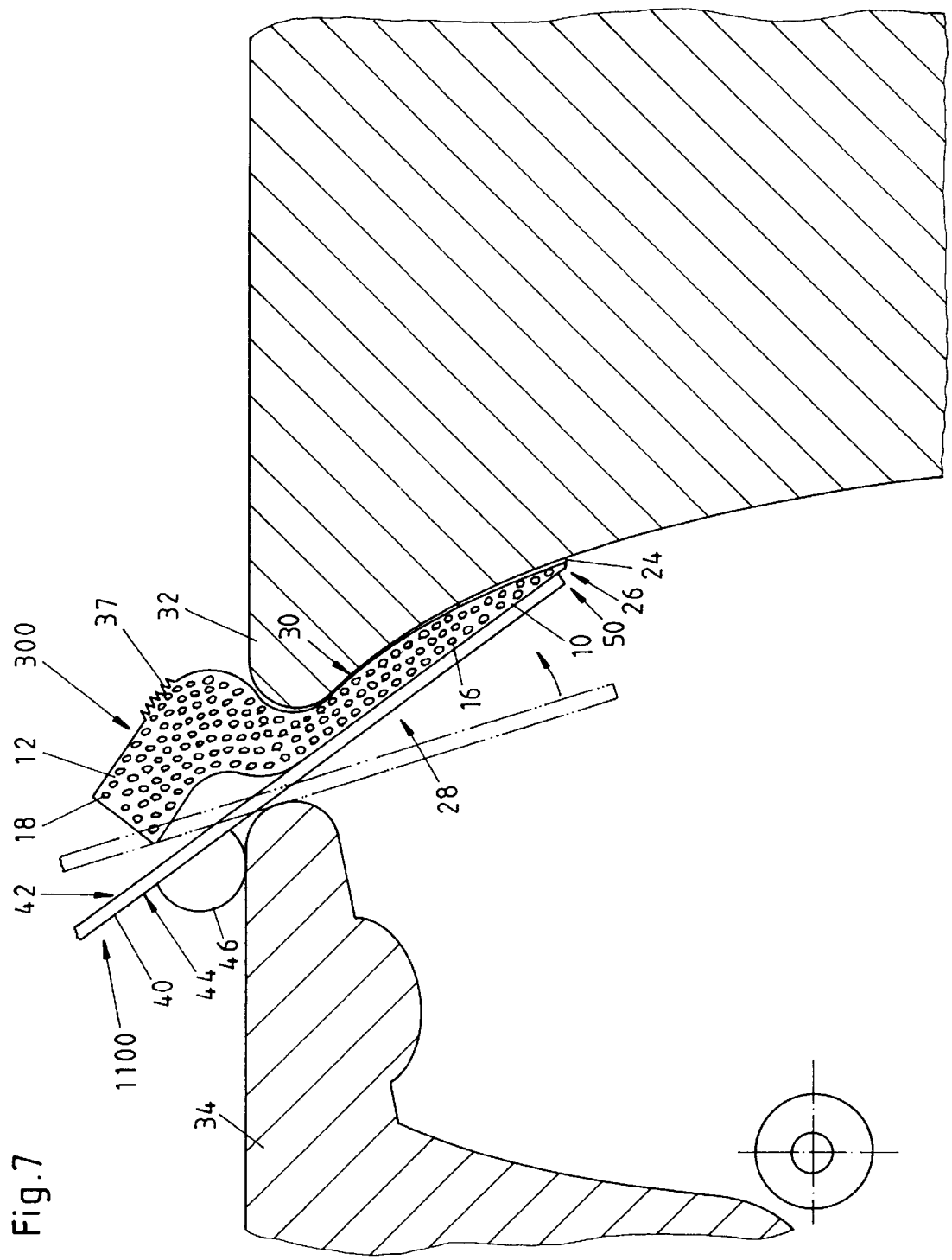
Figure 8:
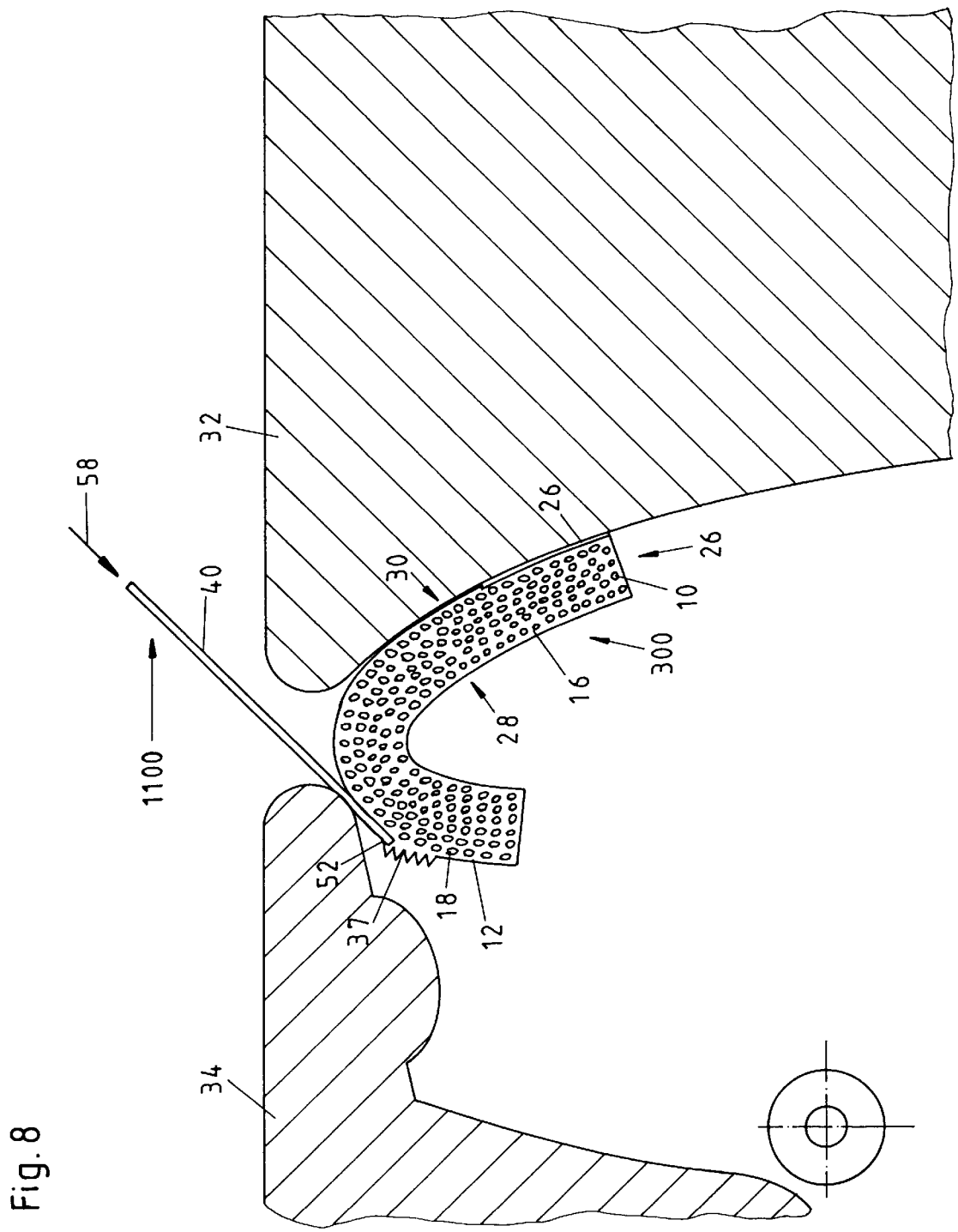

FIGS. 6 through 8 depict in a sectioned view a third embodiment of the cellular material strip 300 according to the invention in different configurations while being fitted into a gap between two vehicle body portions 32, 34 analogously to the FIGS. 1 through 3. This cellular material strip 300 corresponds substantially to the cellular material strip 100 of the FIGS. 1 through 3, however, it is not provided with any deformation grooves. The disposition of the cellular material strip and its position with the pertinent sealing function corresponds to the situation already described with the aid of the FIGS. 1 through 3.

FIGS. 7 and 8 additionally depict the employment of a device 1100 for inserting a cellular material strip 300 into the gap. Following the insertion of the cellular material strip 300 into the gap (FIG. 6), one end 52 of the device 1100 is inserted into the gap between the cellular material strip 300 and the body portion 34 until a raised portion 46 of a rod 40 of the device comes into contact with the body portion 34 (FIG. 7). The distance between the raised portion 46 and the end 52 of the rod 40 corresponds to the length of the leg 16 of the cellular material strip 300. Consequently, the device 1100, when the raised portion comes to touch the body portion, is positioned exactly in such a way that, when the device is rotated about the point of contact at the elevated point 46, the end 52 of the rod presses precisely that part of the leg 16 against the body portion 32, on which the adhesive coat 24 is disposed. Hereby a firm adhesive connection between the leg 16 and is produced.

After this the rod 40 is withdrawn again and placed in position at the bend behind the tear-off edge 37 (FIG. 8). By the rod 40 being pushed in the direction of arrow 58, the leg 18 is ultimately pressed into the gap and, as has already been depicted in connection with the FIGS. 1 through 3, seals the gap by means of elastic force.

Figure 9:
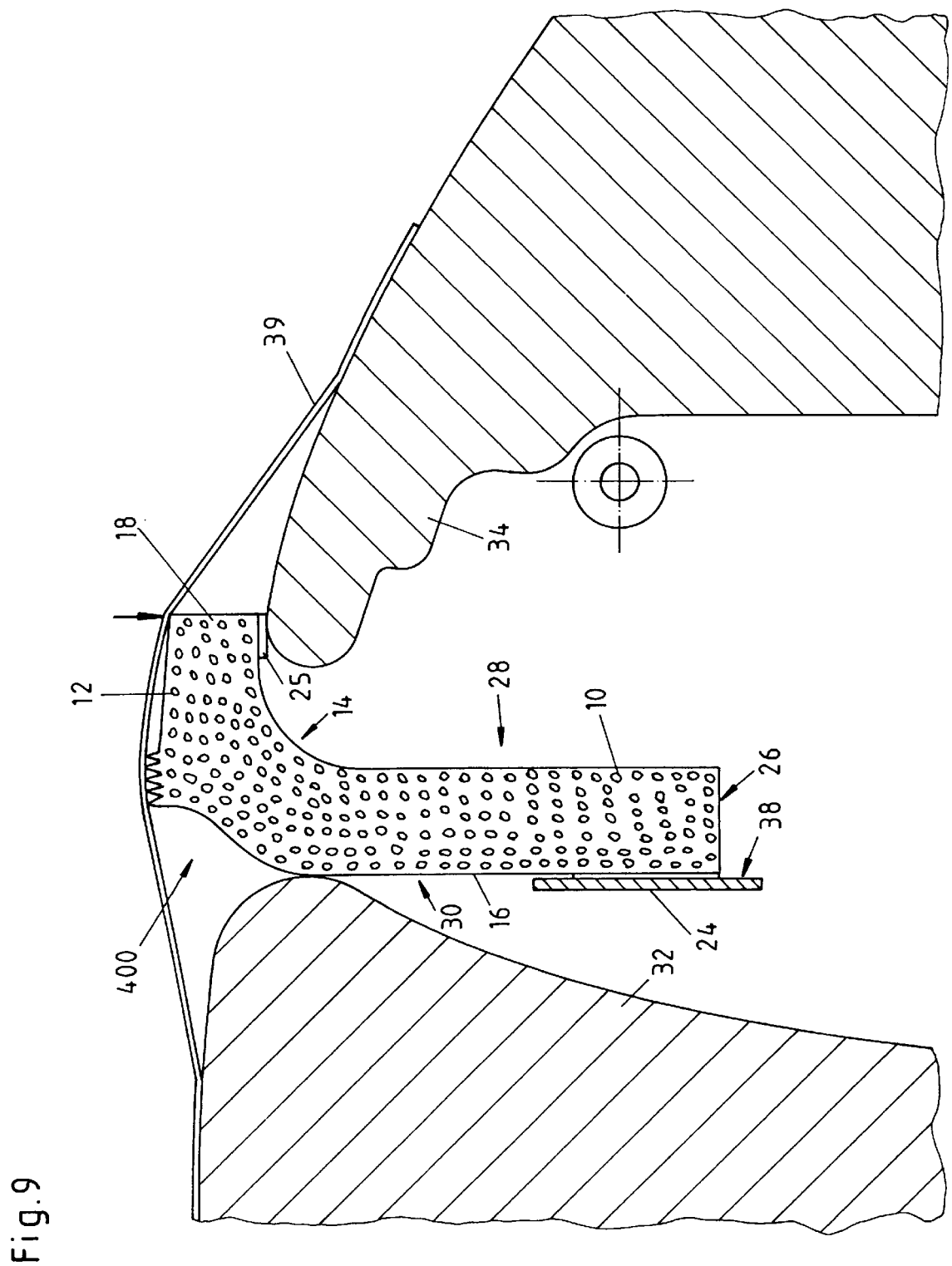
FIGS. 9 through 11 show in a sectioned view a fourth embodiment of the cellular material strip according to the invention in different configurations while being fitted into a gap between two body portions, with a fitting aid.
Figure 10:
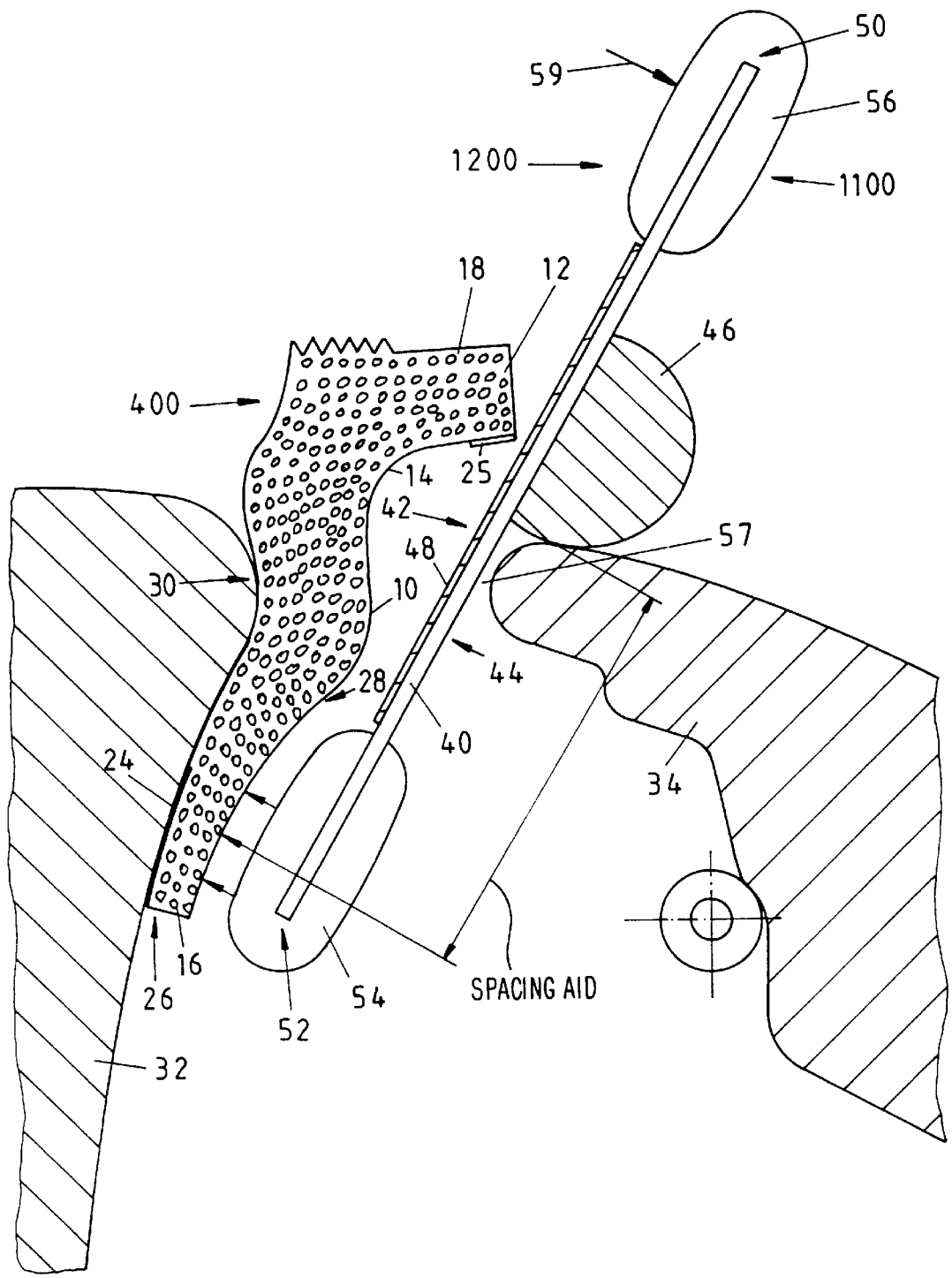
Figure 11:
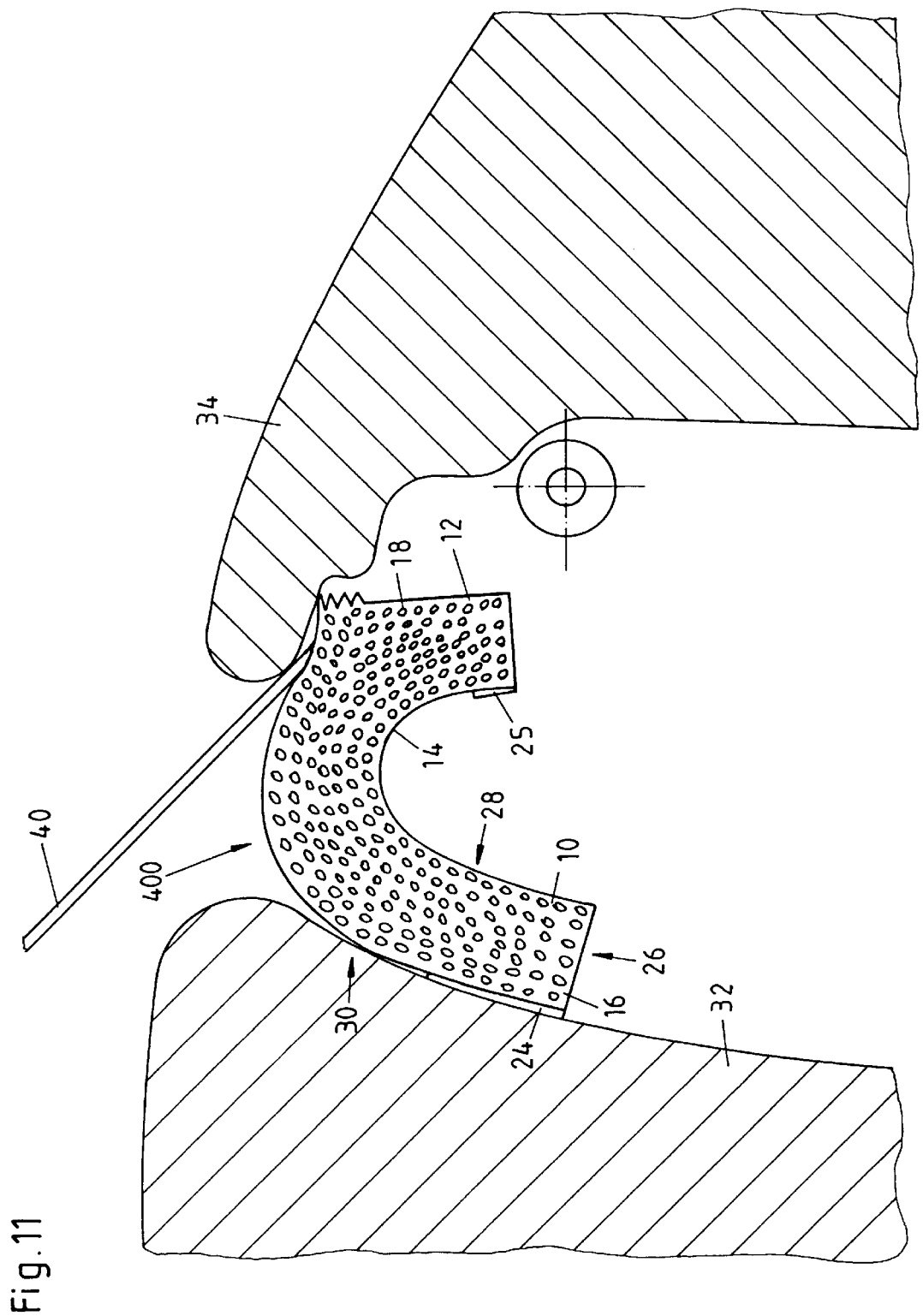
Figure 12:
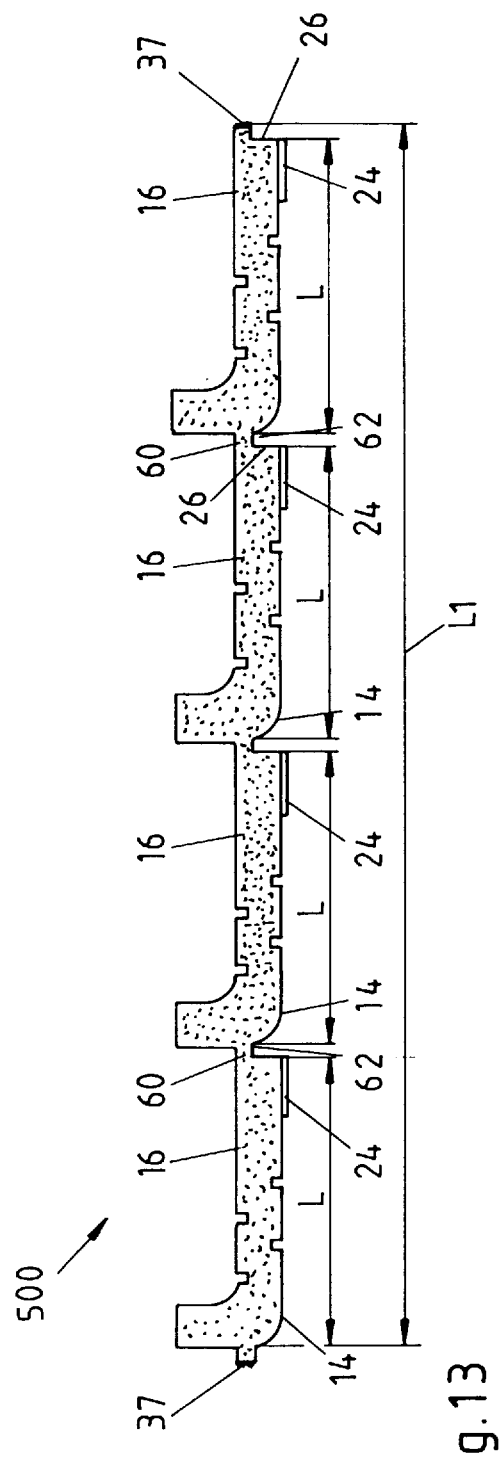
FIG. 12 shows in a side view a configuration of cellular material strips from FIGS. 4 and 5.
Figure 13:
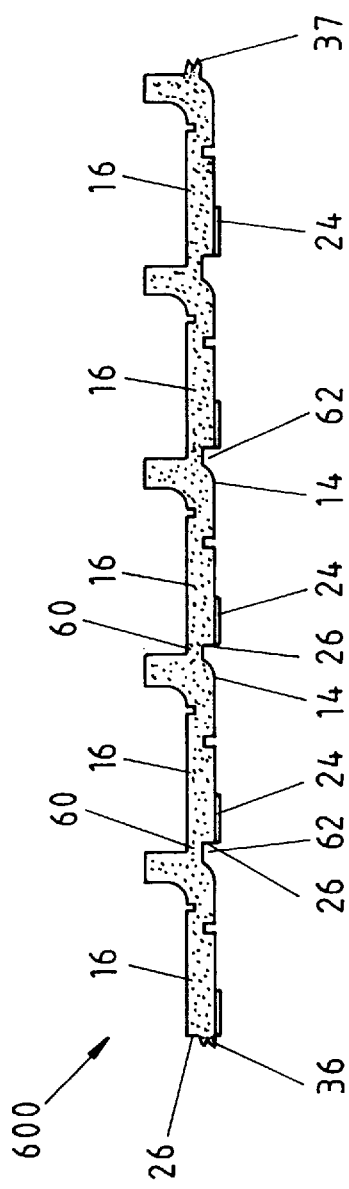
FIG. 13 shows in a side view an assembly of cellular material strips from FIGS. 1 through 3.
Figure 14:
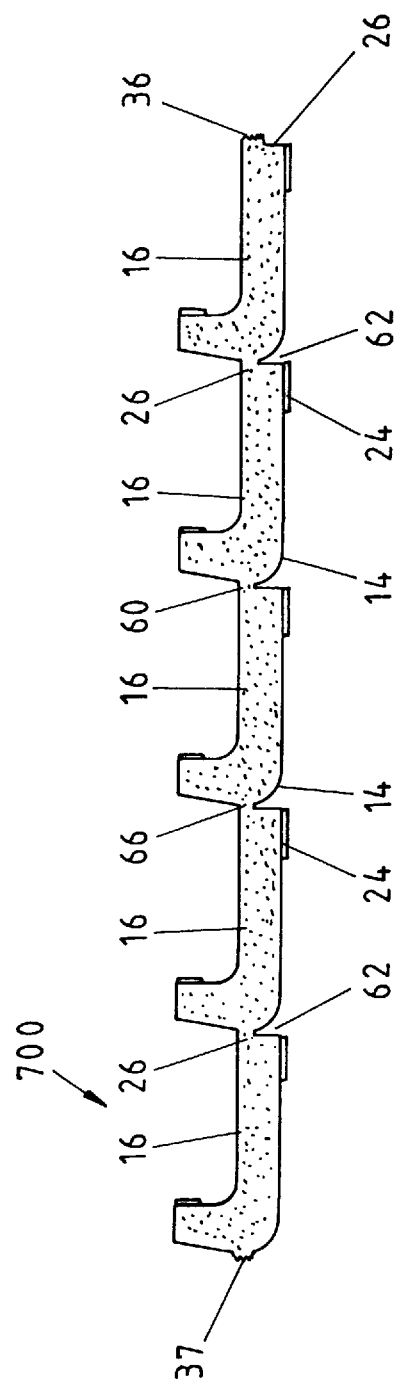
FIG. 14 shows in a side view a configuration of cellular material strips from FIGS. 9 through 11.
Figure 15:
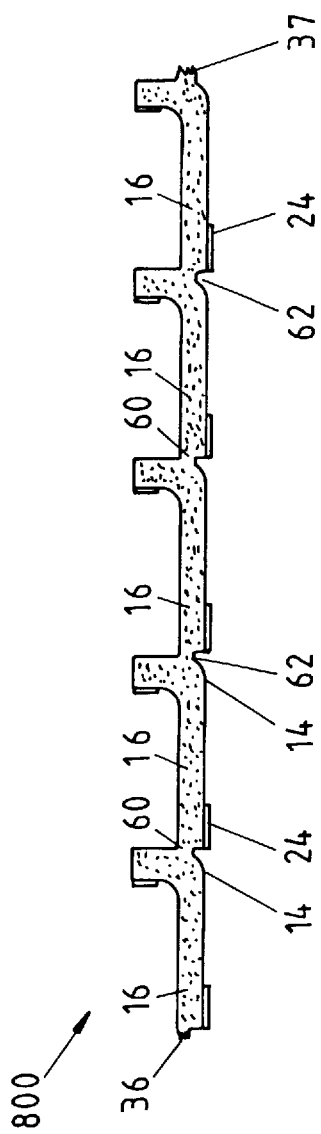
FIG. 15 shows in a side view a configuration of cellular material strips from FIGS. 6 through 8.

The FIGS. 9 through 11 illustrate in a sectional view a fourth embodiment of the cellular material strip 400 according to the invention in different configurations while being fitted into a gap between two vehicle body portions 32,34 analogously to the FIGS. 1 through 3. This cellular material strip 400 corresponds substantially to the cellular material strip 100 of FIGS. 1 through 3, it does, however, not possess any deformation grooves but, additionally, an adhesive coat 25 on the leg 18. The configuration of the cellular material strip 400 and its position with the pertinent sealing function corresponds to the situation already described with the aid of the FIGS. 1 through 3.

Figure 18:
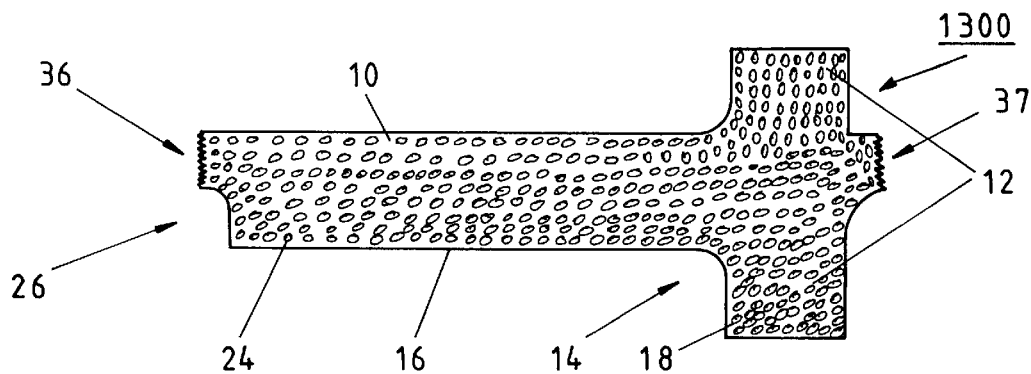
Figure 20:
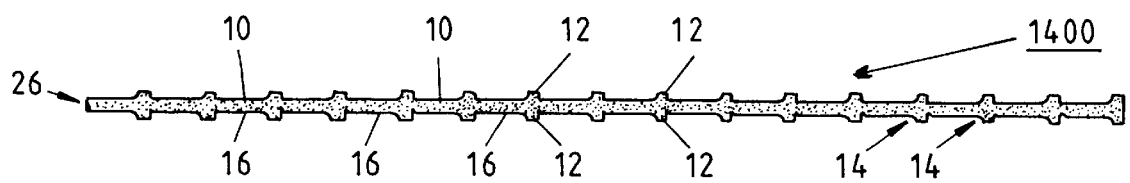
FIG. 20 shows in a side view a configuration of cellular material strips from FIGS. 18 and 19.

FIGS. 18 and 19 depict in a sectional view a fifth embodiment of the cellular material strip 1300 according to the invention. This strip of cellular material 1300 corresponds substantially to the cellular material strip 100 of the FIGS. 1 through 3, one leg 12, however, extends on both sides relative to the leg 10 so that a T-configured section is produced.

In FIG. 10 a second embodiment of the device 1200 for the insertion of the cellular material strip 400 is illustrated. In addition to the device 1100 of FIG. 7, this embodiment possesses pressure pads 54,56 and an anti-stick coating 48. The anti-stick coating 48 is intended to prevent an adherence of the rod 40 to the adhesive coat 25. The pressure pads 54,56 support the pressing of the leg 16 onto the body portion 32 when the device 1200 is urged into the direction of arrow 59 and, at the same time, prevents the leg 16 from being damaged. FIG. 11 on the other hand shows the terminal position of the incorporated cellular material strip 400.

As can be clearly seen from FIG. 10, the raised portion 46 serves not merely as spacing aid for the correct positioning of the pressure pad 54, but also as a lever roll-off edge. The lever action develops about a point of rotation 57 on the body portion 34. By preference, the rod 40 possesses a width of approximately 10 cm.

Moreover, FIG. 9 shows an alternative fixation of the cellular material strip 400. The adhesive coat 24 is covered by a paper strip 38 which, preferably, is provided with a siliconized surface. Because of this it can be readily drawn off for the steps shown in the FIGS. 10 and 11. However, in the alternative fixation method depicted in FIG. 9, the adhesive coat 24 is not used, but an adhesive coat 25 provides an adhesive connection with the body portion 34. In addition, a strip of Scotchtape 39, preferably a crepe-type Scotchtape, secures the retention of the cellular material strip 400 for a sealing fit. The adhesive point 25 preferably possesses a surface area of 5×5 mm$^2$.

FIGS. 12 through 17 and 20 are side views of configurations 500, 600, 700, 800, 900, 1000 and 1400 of the cellular material strips 100, 200, 300, 400, 1300, respectively. The long legs 16 are aligned with one another and oriented in such a way that one of their ends 26 abuts against a next cellular material strip within the region of the bend 14. There, two adjacent cellular material strips each are interconnected by means of a tea-roff bridge 60. When the cellular material strips are employed, the same are torn off one after another from such chains. On each cellular material strip the above-mentioned tear-off edges 36,37 then remain. Separating notches 62 are disposed on the tear-off bridges 60.

The profile of the cellular material strips preferably possesses the following dimensions: A thickness or cross section of the legs from 1 mm through 10 mm, preferably 4 mm and 6 mm. A length of the long leg 16 inclusive of bend 14 of 20 mm through 50 mm, preferably though 25 mm, 26 mm, 30 mm and 40 mm. A width of the separating notches 62 from 0.5 mm through 5 mm, preferably though 1 mm and 2 mm. A length of the short leg 18 inclusive of the bend 14 of 5 mm through 20 mm, preferably though 10 mm and 14 mm. A thickness of the tear-off bridges transversally to the legs 62 from 1 mm through 5 mm, preferably though 2 mm and 3 mm. A width of the tear-off bridges 60 in the direction of the legs 16,18 of from 0.5 mm through 5 mm, preferably though 1 mm and 2 mm. A length of the adhesive coats 24,25 of from 5 mm through 10 mm, preferably though 6 mm and 8 mm.

Figure 16:
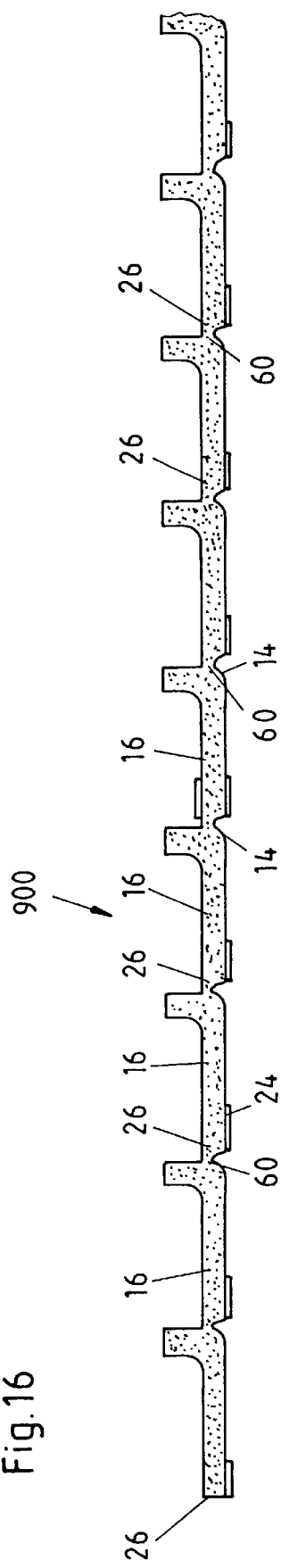
FIGS. 16 and 17 show in a side view further configurations of further cellular material strips.
Figure 17:
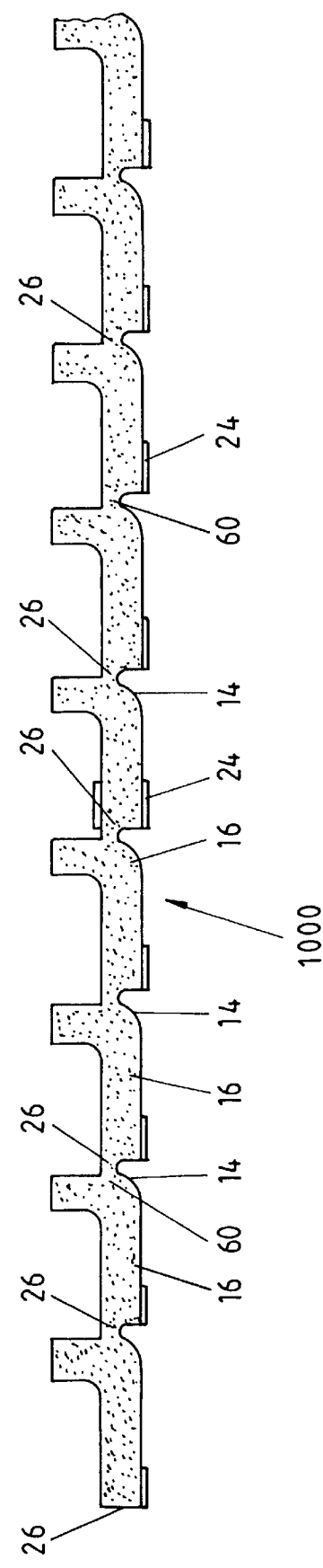

As becomes apparent from the FIGS. 16 and 17, the adhesive coat 24 may also be disposed on both sides of the leg 16.

Figure 21A:
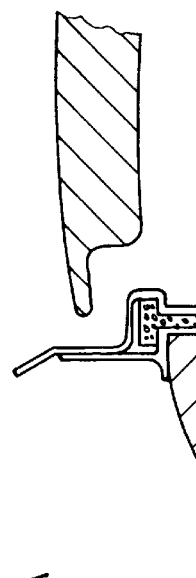
FIGS. 21A, 21B and 21C show the use of the applicator as per FIG. 21 for the application of a strip of cellular material into the gap between the engine hood of a vehicle and the front fender.
Figure 21B:
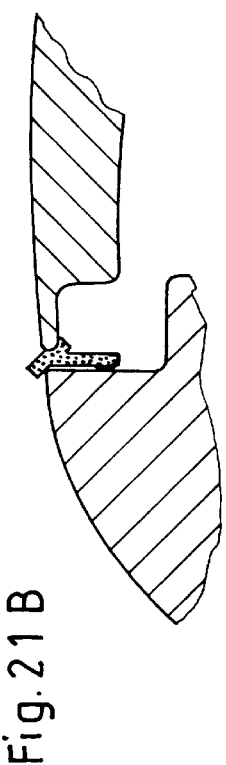
Figure 21C:
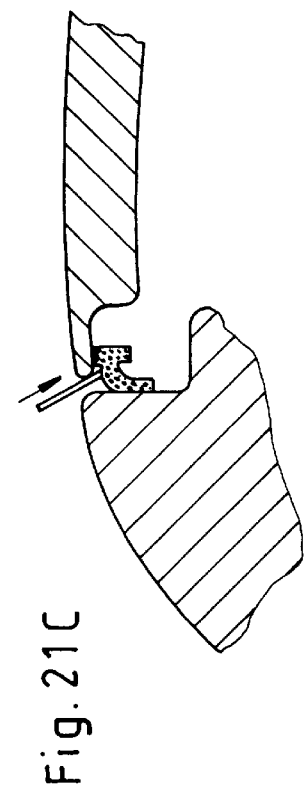
Figure 21:
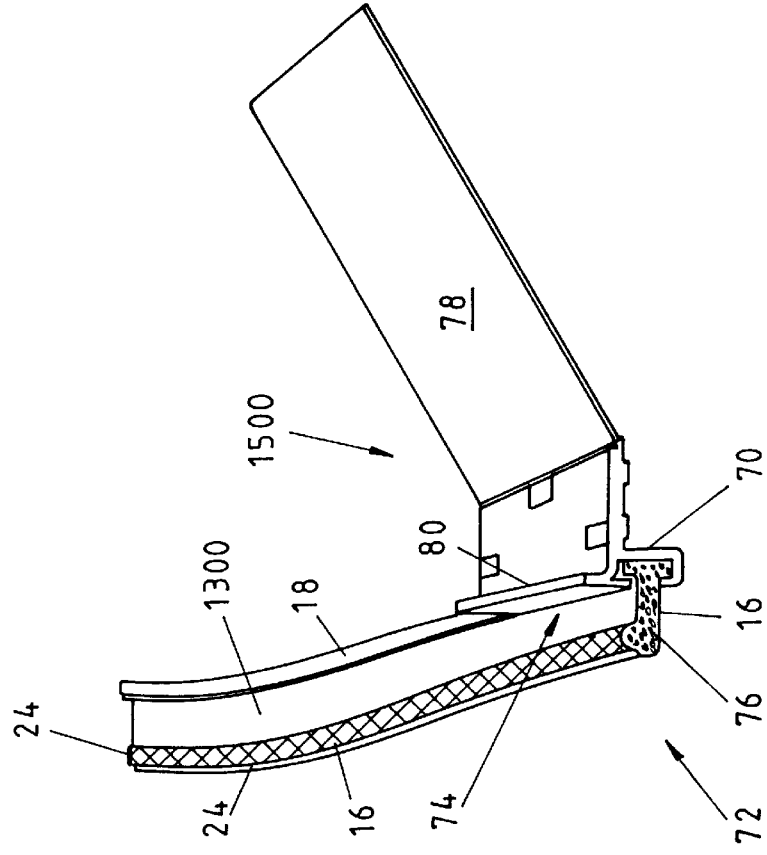
FIG. 21 shows a perspective view of an applicator according to the invention.

FIG. 21 shows an applicator 1500 according to the invention, which is attached to a T-shaped strip 1300. For this, the applicator is provided with a guide bar 70.

The same is designed in such a way that it encloses the short legs 18 of the T-configured cellular material strip 1300. Because of this, the applicator can be guided along the cellular material strip 1300, but a protrusion of the cellular material strip 1300 from the bar is prevented.

A long leg 16 of the cellular material strip 1300 bearing an adhesive coat 24 projects from a longitudinal slaot 74. On the side of the long leg 16 located opposite the adhesive coat 24, a first limit stop 76 is disposed. In addition, a second limit stop 80 is provided. Moreover, on the guide bar, a grip or handle 78 is constructed.

Figure 22:
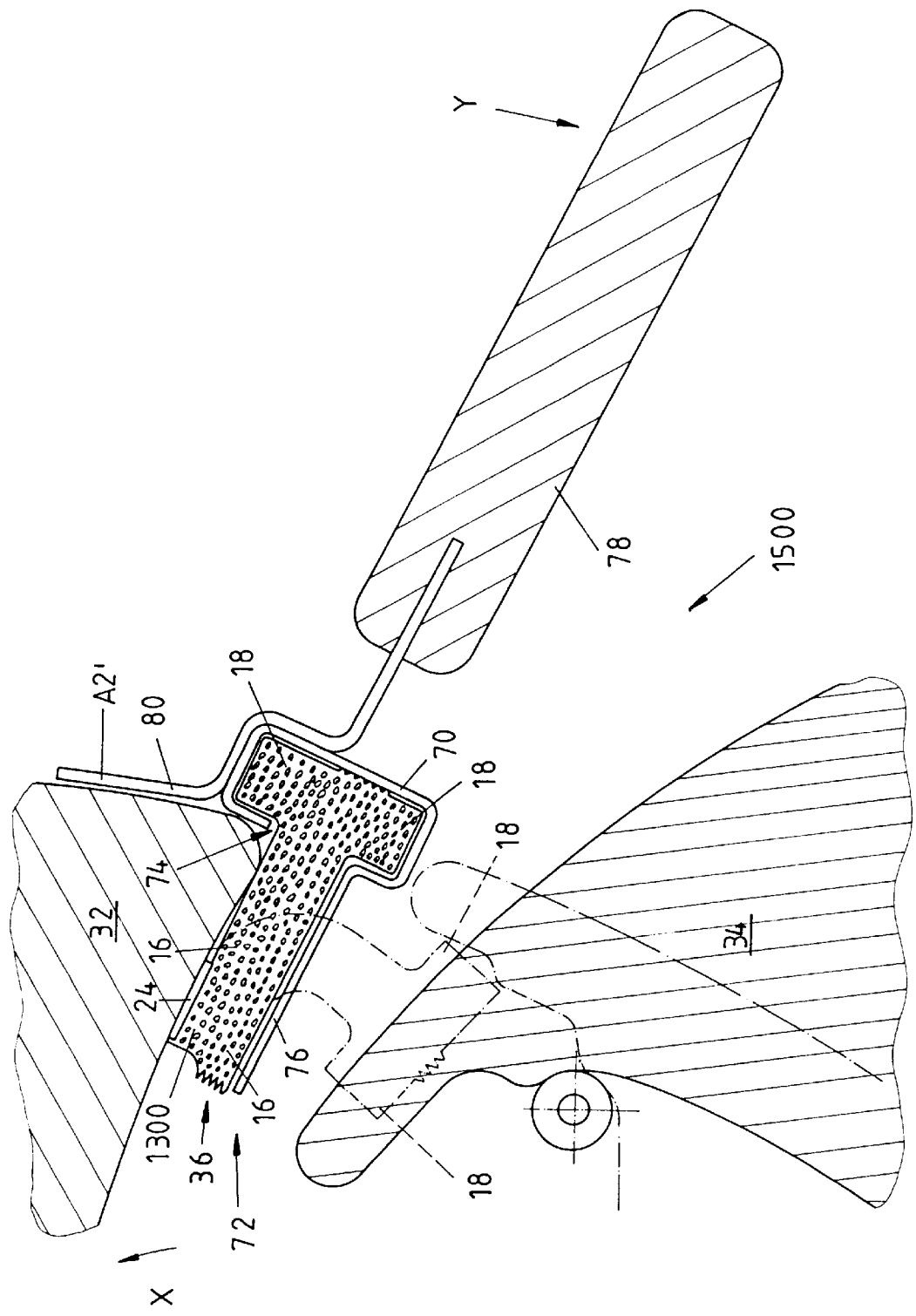
FIG. 22 shows in a sectioned view the employment of the applicator according to the invention.

FIG. 22 depicts the application of the cellular material strip 1300 with the aid of the applicator 1500 according to the invention. The strip of cellular material 1300 in the bar 70 and adjacent to the first stop is introduced with its long leg 16 into a gap. The second stop 80 limits in this case the depth of introduction so that the same is predetermined and always constant. If pressure is now exerted upon the grip 78 in the direction of the arrow Y, then the first stop 76 presses the long leg 16 with the adhesive coat 24 against the body portion 32. The adhesive strip 24 then adheres to the body portion 32.

The applicator is now passed along the gap to be sealed and secured over a desired length of the cellular material strip 1300 in the gap.

As indicated by means of dashed lines in FIG. 22, the body portion 34 is then moved into a closing position and the short legs 18 of the cellular material strip are pressed into the gap. Consequently a gap seal is completed.

Figure 23:
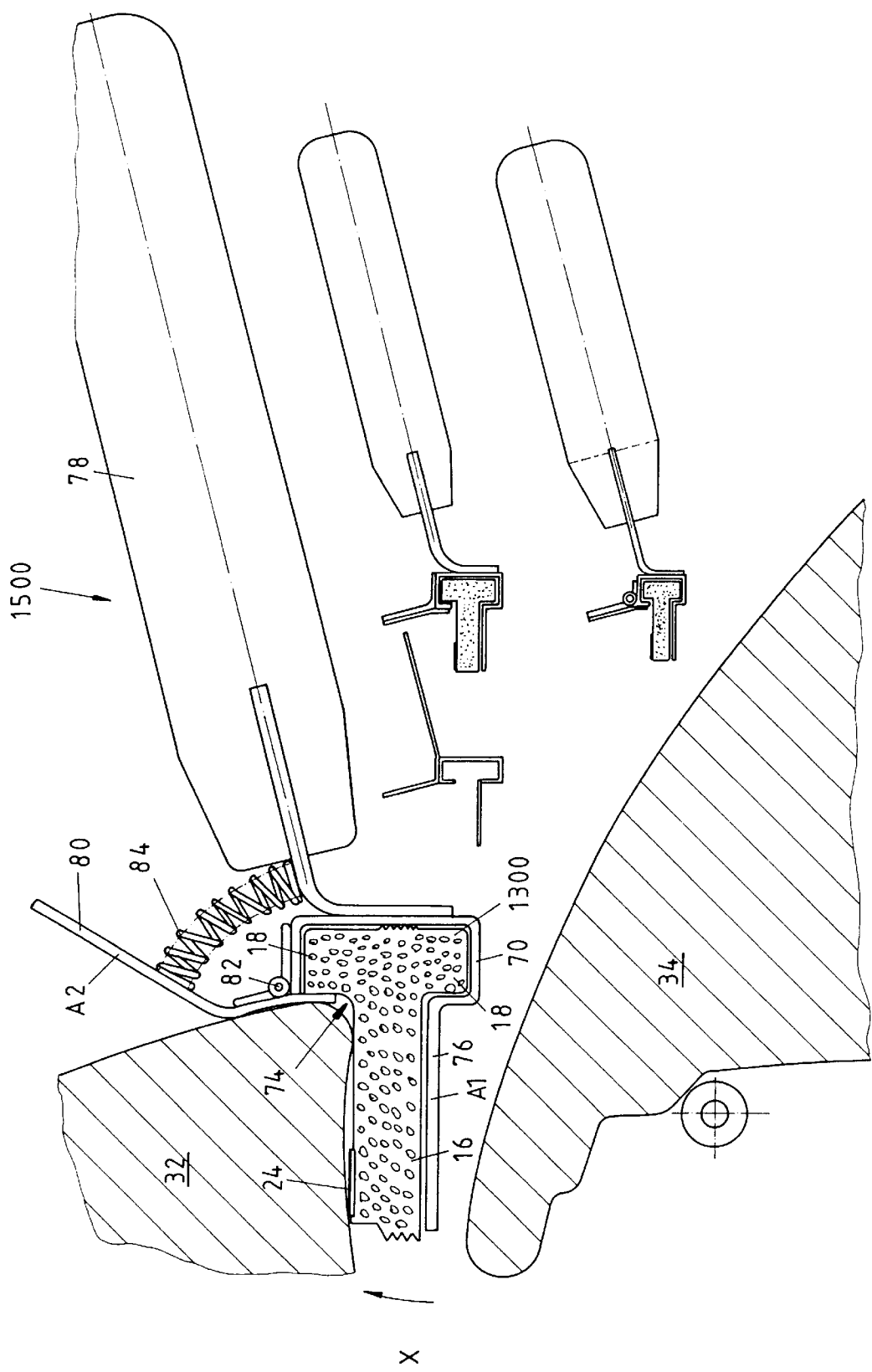
FIG. 23 shows a second embodiment of the applicator according to the invention.

FIG. 23 depicts a second embodiment of the applicator according to the invention. On this occasion the grip 78 is offset relative to the first stop 76. This brings about an additional lever action and simplifies the handling of the applicator.

The second stop 80 is mounted on a hinge 82 and acted upon by a force with the aid of a spring 84. This assembly serves initially for bending away the stop 80 against the elastic force from the body portion 32 when the cellular material strip 1300 is inserted. After that the elastic forst rights the second stop 80 once again and the same serves as an inserting aid for the short legs 18 into a position as indicated in dashed lines in the FIG. 22.

Figure 24:
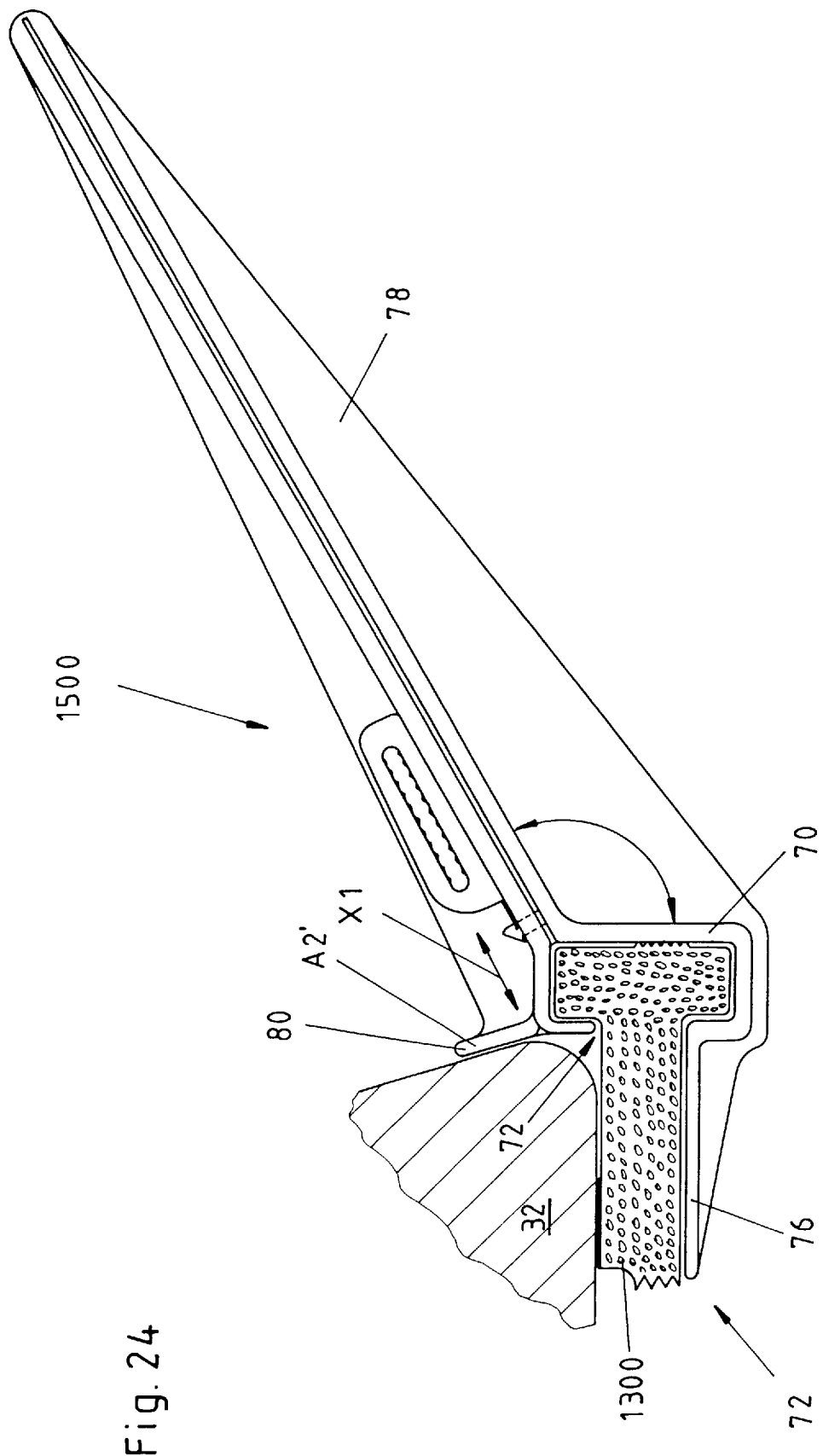
FIG. 24 shows a third embodiment of the applicator according to the invention.

FIG. 24 shows a third embodiment of the applicator according to the invention. On this occasion the second stop 80 is constructed so as to be displaceable. The depth of insertion of the cellular material strip 1300 can thus be variably preset, depending upon the requirements of the gap to be sealed and the cellular material strip employed.

What is claimed is:

1. A cellular material strip having a constant cross-section for sealing a gap between two body portions, the cellular material strip comprising first and second legs and a bend between the first and second legs, the first and second legs extending at approximately a right angle relative to each other, the first and second legs each having a length, the length of the first leg being greater than the length of the second leg, the first leg having at least two deformation grooves for an increased flexibility of the cellular material strip, the deformation grooves extending in a longitudinal direction of the cellular material strip, the deformation grooves being located on opposite sides of the first leg and alternatingly offset relative to each other over the length of the first leg, a first of the deformation grooves being located at an end of the first leg adjacent the bend, the first leg having an adhesive coat in an end portion of the first leg remote from the bend, the adhesive coat being located at at least one of on a side facing the second leg and a side facing away from the second leg.

2. The cellular material strip according claim 1, wherein the angle between the first and second legs is smaller than 90°.

3. The cellular material strip according claim 1, wherein the angle between the first and second legs is greater than 90°.

4. The cellular material strip according claim 1, wherein the angle between the first and second legs is equal to 90°.

5. The cellular material strip according to claim 1, wherein the second leg has an adhesive coat in an end portion of the second leg remote from the bend, the adhesive coat being located at at least one of on a side facing the first and a side facing away from the first leg.

6. The cellular material strip according to claim 1, wherein the first deformation groove is located on the side of the first leg facing the second leg.

7. The cellular material strip according to claim 1, wherein the adhesive coat of the first leg is located on the side of the first leg facing away from the second leg and the adhesive coat on the second leg is located on the side of the second leg facing away from the first leg.

8. The cellular material strip according to claim 1, further comprising a third leg extending in alignment with the second leg and at a right angle with the first leg, such that the cellular material strip has a T-shaped configuration.

* * * * *